United States Patent [19]

Sampson

[11] Patent Number: 5,293,669

[45] Date of Patent: Mar. 15, 1994

[54] MULTI-USE FASTENER SYSTEM

[76] Inventor: Gregory Sampson, 2374 S. Colony Dr., Mt. Prospect, Ill. 60056

[21] Appl. No.: 989,096

[22] Filed: Dec. 11, 1992

[51] Int. Cl.$^5$ ............................................. B65D 63/00
[52] U.S. Cl. .................................. 24/16 PB; 24/17 AP
[58] Field of Search ............. 24/16 PB, 17 AP, 30.5 P

[56] References Cited

U.S. PATENT DOCUMENTS

| | | | |
|---|---|---|---|
| 3,570,497 | 3/1971 | Lemole | 24/16 PB |
| 3,761,999 | 10/1973 | Morgan | 24/16 PB |
| 4,008,512 | 2/1977 | Prodel | 24/16 PB |
| 4,236,280 | 12/1980 | Kreiseder | 24/16 |
| 4,507,828 | 4/1985 | Furutsu | 24/17 AP |
| 4,866,816 | 9/1989 | Careney | 24/16 |
| 4,881,301 | 11/1989 | Sweeney et al. | 24/30.5 |
| 4,944,475 | 7/1990 | Ono et al. | 24/16 PB |
| 4,958,414 | 9/1990 | Benoit | 24/16 |

FOREIGN PATENT DOCUMENTS 2435353 2/1976 Fed. Rep. of Germany ... 24/16 PB

Primary Examiner—Victor N. Sakran
Attorney, Agent, or Firm—Allegretti & Witcoff, Ltd.

[57] ABSTRACT

This invention is a reusable single piece securing device including a head having a first side and a second side, a first channel passing through the head having a first aperture associated with the first end of the head and a second aperture associated with the second end of the head, a lace lock flexibly associated with the head, and an elongated flexible lace having a first end integral to the head, and a second end, the first and second ends divided by an intermediate section including a plurality of lace teeth.

9 Claims, 5 Drawing Sheets

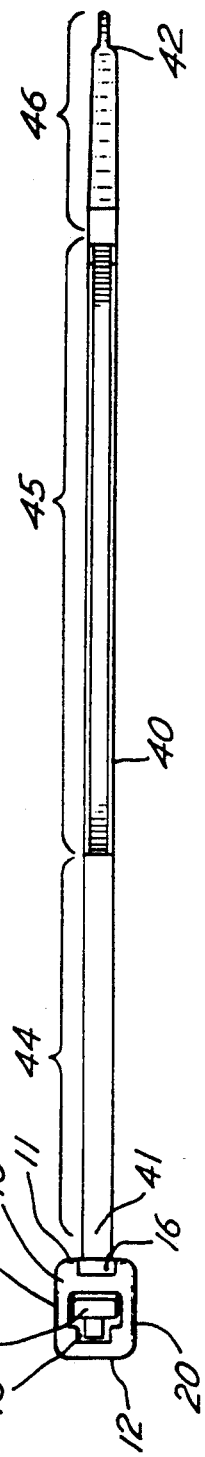
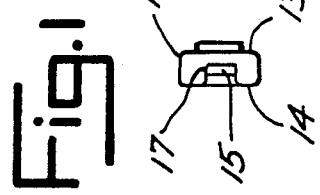

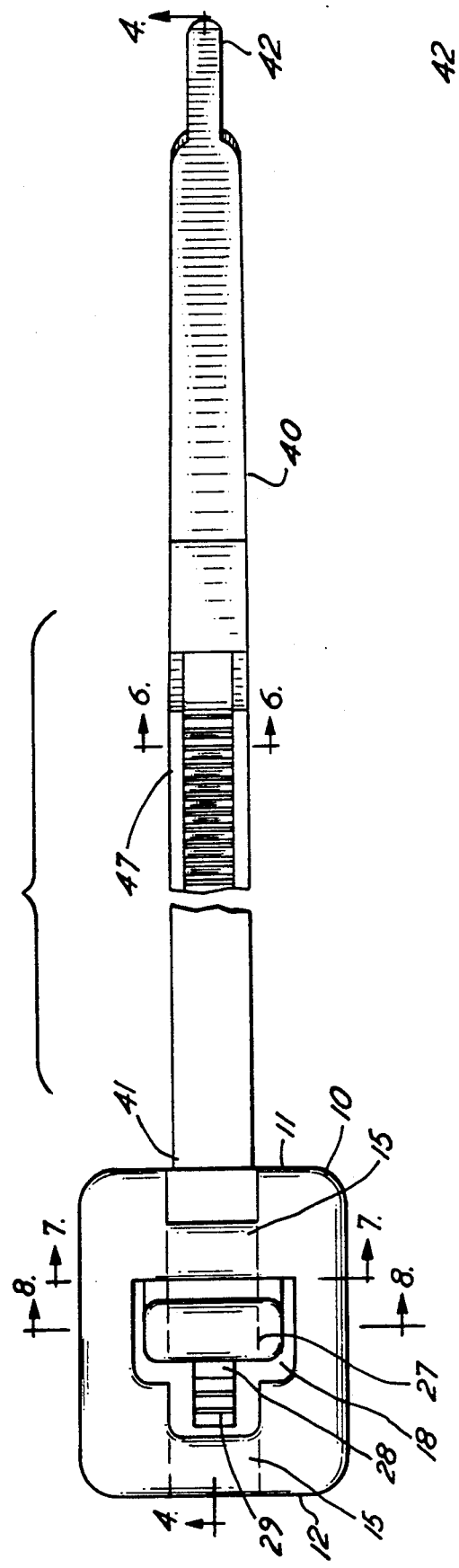
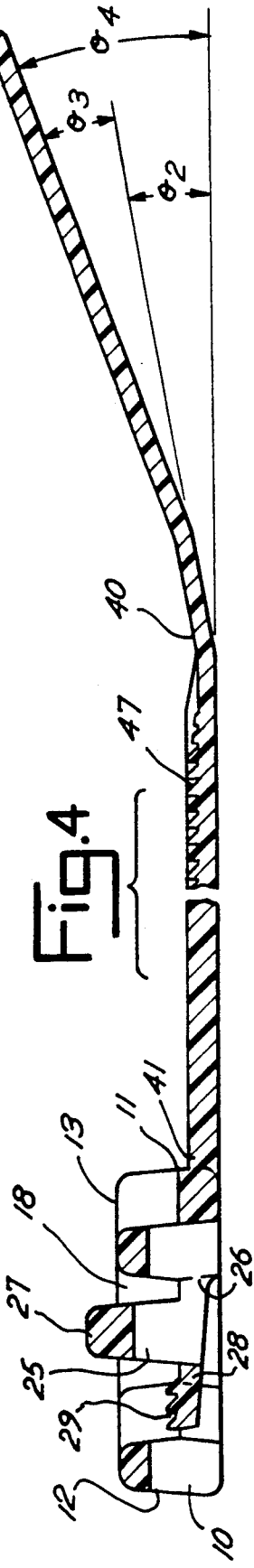

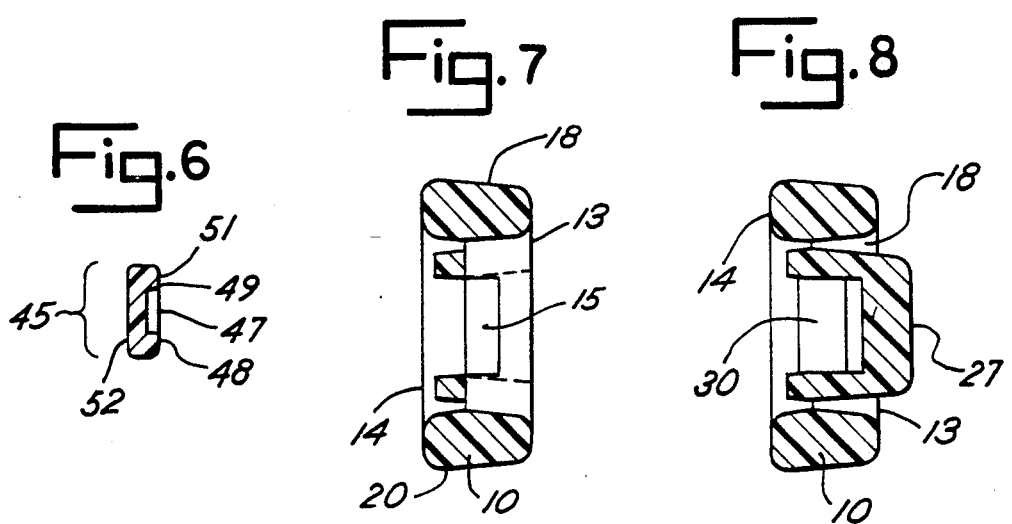
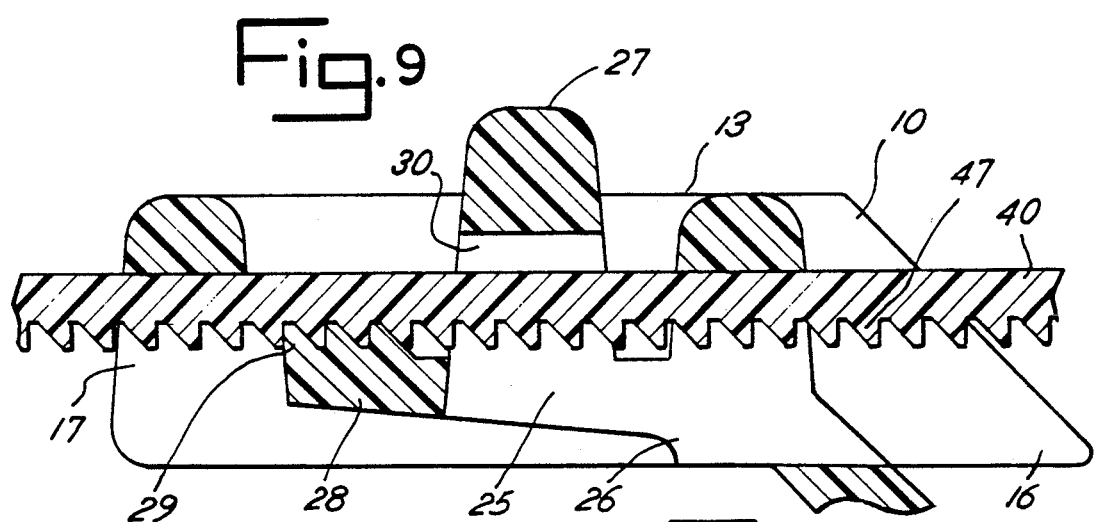
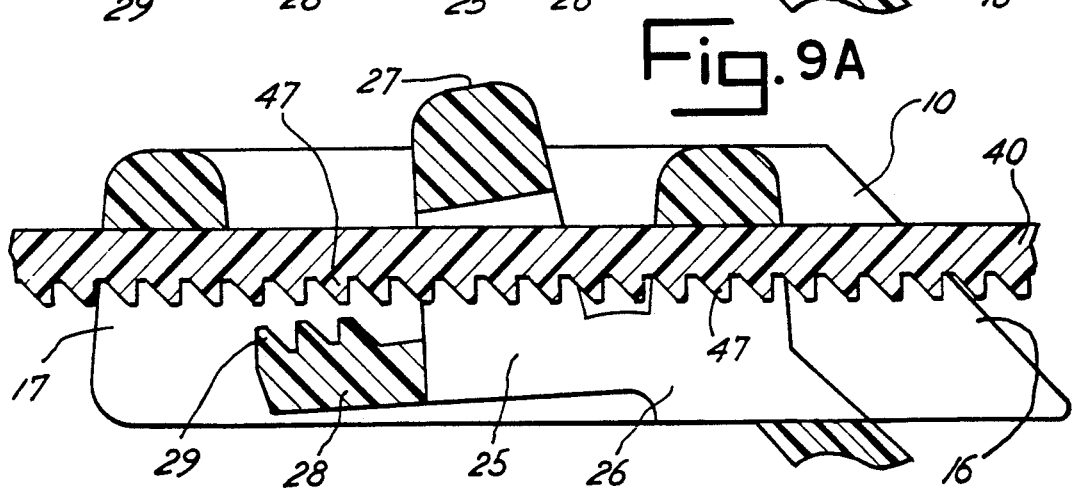

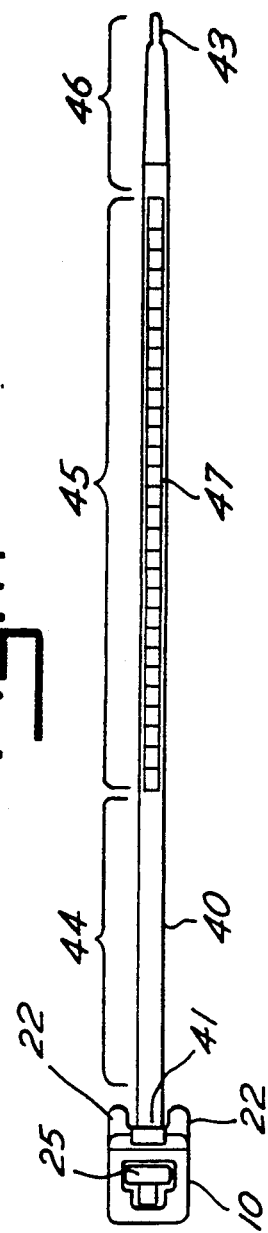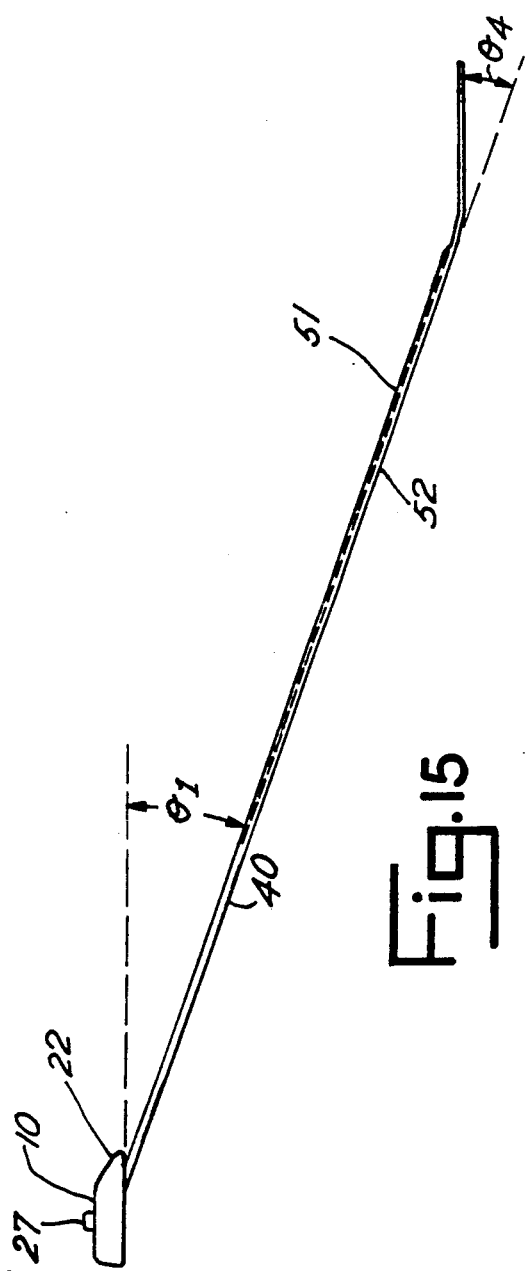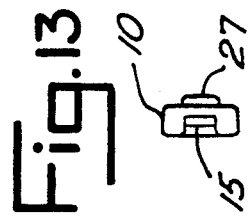

MULTI-USE FASTENER SYSTEM

BACKGROUND OF THE INVENTION

(1) Field of the Invention

This invention concerns a reusable single piece fastener system that is useful for reversibly securing securable items. The reusable single piece fastener of this invention can be used in place of laces, clasps, clips, tics, and other securing methods and is especially useful as a lace for shoes. This invention is also a method for reversibly securing securable items using a single piece fastener this invention.

(2) Description of the Art

A variety of fasteners are well know in the art. Cable ties are used to unite wire bundles, plastic clamps are used to seal plastic bags, and zippers are used to unite cloth items. The cable tie and clamp fasteners are generally intended to be used one time. The clothing and footwear fasteners on the other hand are intended to be fastened and released many times during their useful lifetime.

An example of a one-use cable tie device is found in U.S. Pat. No. 4,866,816 (Caveney) which discloses a single piece wire harnessing device. The harnessing device includes an elongated strap and a head. The elongated strap cannot be disengaged once it is united with the head. The harnessing device has no lock release mechanism.

An example of a reusable plastic clamp is found in U.S. Pat. No. 4,881,301 (Sweeney et al.). The plastic clamp disclosed is an arcuate band with two interlocking tips. The two tips of the clamp are toothed and two hands are required to engage and disengage the clamp.

Single piece reusable cable ties are disclosed in U.S. Pat. No. 4,958,414 (Benoit) and 4,236,280 (Kreiseder). The '414 patent describes a reusable tie-all having a single strap and a socket. The tie-all includes an elongated flexible strap, and a casing. The casing includes a top wall that is directed upwards to disengage the locked flexible strap making the tie-all reusable.

The '280 patent discloses a one piece plastic strap clamp having a base portion and a body. The base portion passes perpendicularly through the body and includes teeth complementary to a latch means. The latch means, located on one side of the body is pressed to disengage the base from the body.

SUMMARY OF THE INVENTION

It is an object of this invention to provide a reusable single piece fastener.

It is another object of this invention to provide a method for securing a securable item using a reusable single piece fastener.

It is yet another object of this invention to provide a reusable single piece faster that is easily engaged and disengaged with one hand.

It is still another object of this invention to provide a functional and aesthetic replacement for laces, buckles, clamps and other fasteners used in conventional shoes, and athletic shoes such as sneakers, cleats, in-line-skates, ski-boots, hockey skates, and ice skates among others.

It is still another object of this invention to provide a flexible and reusable plastic shoe lace that is simple to manipulate.

It is yet another object of this invention to provide a shoe lacing system that allows for individual control of the tension of each lace transition.

In one embodiment, this invention is a reusable single piece fastener. The fastener includes a head including a first side and a second side. The head also has a first channel passing through it having a first aperture associated with the first side of the head and a second aperture associated with the second side of the head. The fastener also includes a lace lock flexibly associated with the head including a flex point uniting the lace lock with the head, a lock release button, a pivot arm having a plurality of locking teeth, and a second channel complementary to the first channel. Finally, the fastener includes an elongated flexible lace having a first end integral to the head, a second end, and a plurality lace teeth complementary to the locking teeth.

In another embodiment, this invention is a reusable single piece lace. The single piece shoelace includes a head having a top, a bottom, a first side having two tapered fingers, a second side, a first channel parallel too the top and bottom passing through the head, a first aperture associated with the channel and with the first side of the head, and a second aperture associated with the channel and with the second side of the head. The shoelace also includes a lace lock flexibly associated with the head including a flex point uniting the lace lock with the head, a lock release button extending beyond the head, and a pivot arm having from three to six locking teeth directed towards the top of the head. The lace lock also includes a second channel parallel to the top and bottom of the head and complementary to the first channel. Finally, the single piece lace includes an elongated flexible lace having a first end integral to the first end of the head and located between the two tapered fingers, an intermediate section including a plurality of lace teeth, and a second tapered end including a nib. The elongated flexible lace is wide enough to be retained in the first channel and in the second channel.

In yet another embodiment, this invention is a method for engaging a reusable single piece fastener. The single piece fastener used in the method comprises a head including a first side and a second side, a first channel passing through the head from the first side to the second side, the head having a first aperture associated with the first channel and with the first side of the head and an opposing second aperture associated with the first channel and with the second side of the head. A lace lock is flexibly associated with the head and includes a flex point uniting the lace lock and the head, a lock release button, a pivot arm having a plurality of locking teeth, and a second channel complementary to the first channel. Finally, the reusable single piece fastener includes an elongated flexible lace having a first end integral to a side of the head, a second end, and an intermediate section having a plurality lace teeth complementary to the locking teeth. The reusable single piece fastener is engaged by passing the second end of the elongated flexible lace through the first or second aperture, through the first channel and the second channel and out of the opposing aperture. Next, the protruding second end of the elongated flexible lace is grasped and pulled until one or more of lace teeth engages one or more locking teeth of the lace lock. The elongated flexible lace is then pulled until the fastener is in the desired securing position.

In still another embodiment, this invention is a method for using one or more reusable flexible single piece shoelaces to secure a lace transition between two eyelets of a shoe. The reusable single piece shoelace comprises a head, a lace lock, and an elongated flexible lace. The head includes a top, a bottom, a first side having two integral tapered fingers, a second side, a first channel parallel to the top and bottom of the head and passing through the head, a first aperture associated with the first channel and with the first side of the head, and an opposing second aperture associated with the first channel and with the second side of the head. The lace lock is flexibly associated with the head and includes a flex point uniting the lace lock and the head, a lock release button extending beyond the top of the head, and a pivot arm parallel to the top and bottom of the head and having from three to six locking teeth. The lace lock also includes a second channel complementary to first channel. The elongated flexible lace has a first end located between the tapered fingers and integral to the first side of the head and a second end. The elongated flexible lace includes a first section, an intermediate section including lace teeth and an end section including the second end. Finally, the second end includes a nib that resembles the end of a conventional shoelace.

A lace transition is secured with one of the reusable flexible single piece shoelaces by passing the nib of the second end of the elongated flexible lace through a first shoe eyelet and through a second shoe eyelet until the two tapered fingers associated with the first end of the head secure the head in the first shoe eyelet. The nib is then directed through the first aperture associated with the first side of the head such that the lace teeth are oriented towards the pivot arm locking teeth. The elongated flexible lace is then pushed through the first channel and the second channel until the nib of the end section of the elongated flexible lace protrudes from the second aperture. Next, the protruding nib is grasped and pulled to draw the elongated flexible lace through the first and second channel until one or more of the plurality of lace teeth of the intermediate section of the elongated flexible lace engages the pivot arm locking teeth. The nib can be grasped and pulled to draw the elongated flexible lace further through the first and second channel to provide the desired lace transition tension. The procedure may be repeated using a reusable flexible single piece shoelace for each lace transition on the shoe.

DESCRIPTION OF THE DRAWINGS

There is shown in the drawings a presently preferred embodiment of a reusable single piece fastener of this invention wherein like numerals in the various figures pertain to like elements and wherein:

FIGS. 1—3 are end top and side views respectively of a reusable single piece securing device of this invention;

FIG. 4 is a blow-up side view showing details of the head, lace lock, and the locking teeth section of an elongated flexible lace;

FIG. 5 is a detailed top view of the end section of an elongated flexible lace of this invention;

FIG. 6 is a cross-section view of the elongated flexible lace portion of a fastener of this invention;

FIGS. 7 and 8 are views of two different cross-sections of the head of a fastener of this invention;

FIGS. 9 and 9A are blow-up cross-section views of a lace lock of the fastener of this invention in an engaged and disengaged position respectively;

FIGS. 13–15 are end, top and side views respectively of a reusable single piece shoelace of this invention.

DESCRIPTION OF THE CURRENT EMBODIMENT

Figure 10:
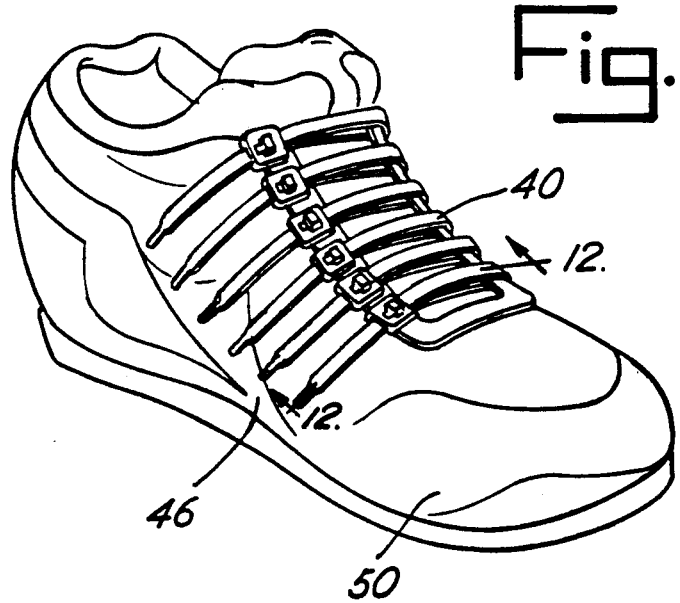
FIG. 10 shows a shoe including a plurality of fasteners of this invention uniting opposing shoe eyelets.

The present invention relates to a reusable single-piece fastener system that is useful for securing securable items. The single-piece securing device of this invention is intended to be used in place of prior art securing devices such as laces, clasps, clips, ties, cable ties, and other securing devices. The single piece fastener of this invention can be used in a variety of applications and especially in applications that require reversible or reusable securing devices. This invention is also a method for using the single-piece fastener to secure securable items and especially for using the fastener item of this invention as a shoelace to form a secured lace transition in a shoe.

Referring now to FIGS. 1-4, the reusable single piece fastener includes a head 10, a lace lock 25, and an elongated flexible lace 40. Elongated flexible lace 40 is integral to a first side 11 or alternatively to second side 12 of head 10. Lace lock 25 is integral to head 10 at flex point 26 and is located in center aperture 18 of head 10.

Head 10 of the reusable single piece fastener of this invention includes first side 11, second side 12, top 13, and a bottom 14. Head 10 further includes a first channel 15 that runs from first side 11 to second side 12. A first aperture 16 defines the channel opening at first side 11 of head 10 while second aperture 17 defines the opening of first channel 15 at second side 12 of head 10. It is preferred that first channel 15 is essentially parallel to top 13 and bottom 14 and parallel to third side 19 and fourth side 20 of head 10.

The location of first channel 15 in head 10 is not critical. However, first channel 15 must be located so that the rigidity of head 10 is not compromised and so that lace lock 25 can be located in a position complementary to first channel 15. Typically, first channel 15 will be evenly spaced between third side 19 and fourth side 20 of head 10. First channel is also preferably located essentially equidistant from top 13 and to bottom 14 of head 10. However, first channel 15 may be located closer to top 13 or bottom 14 depending upon where first end 41 of elongated flexible lace 40 is united with head 10, and depending upon the particular securing application intended for the fastener.

Head 10 may take on various shapes including circles, ovals, rectangles, squares, stars, and other similar shapes. It is important that head 10 is large enough and sturdy enough to encompass lace lock 25 and to include first channel 15.

Head 10 includes a center aperture 18 that is occupied by lace lock 25. First channel 15 is bisected by center aperture 18. However, for purposes of this invention, first channel 15 refers to both portions of bisected first channel 15.

Referring now to FIGS. 4, 5, 9 and 9A, lace lock 25 includes flex point 26 which unites lace lock 25 and head 10. Lace lock 25 includes pivot arm 28 and lock release button 27. Pivot arm 28 further includes locking teeth 29. Finally, lace lock 25 includes a second channel 30 complimentary to first channel 15. Locking teeth 29 of pivot arm 28 engage lace teeth 47 associated with elongated flexible lace 40 to define an engaged or locked fastener.

Flex point 26 of lace lock 25 allows for the movement of pivot arm 28 by depressing or releasing lock release button 27. Flex point 26 has a width approximately equivalent to that of first channel 15. Additionally, the thickness of flexpoint 26 can be adjusted to make the lace lock 25 easy or difficult to engage or disengage.

Lock release button 27 is complimentary to center aperture 18 of head 10. Lock release button 27 may extend beyond top 13 of head 10 or it may be flush with or recessed in center aperture 18 of head 10. It is preferred that lock release button 27 extends beyond top 13 of head 10 so that lace lock 25 can be disengaged by manually pressing lock release button 27. Alternatively, lock release button 27 can be located flush or recessed with respect to top 13 of head 10. In this situation, it would be difficult or impossible to disengage the fastener manually. Instead, a tool such as a screwdriver or other device would be needed to depress lock release button 27 and disengage the fastener.

Lock release button 27 includes a second channel 30 complementary to first channel 15. Second channel 30 is wide enough to accept elongated flexible lace 40, and high enough to avoid contacting elongated flexible lace 40 when lock release button 27 is depressed as shown in FIG. 9A.

Pivot arm 28 of lace lock 25 is integral to lock release button 27. This allows pivot arm 28 to move in unison with lock release button. Pivot arm 28 includes a plurality of locking teeth 29. Locking teeth 29 are designed to be complementary to lace teeth 47. It is preferred that pivot arm 28 is offset towards bottom 14 of head 10 and that locking teeth 29 are directed towards top 13 of head 10. This orientation will result in the pivot arm being located below elongated flexible lace 40 when the fastener is engaged. It is also preferred that pivot arm 28 includes from 3 to 6 locking teeth 28. Additionally, it is preferred that locking teeth 28 are essentially complementary to lace teeth 47 to provide for a secure union between lace teeth 47 and locking teeth 29.

The reusable single piece fastener of this invention includes an elongated flexible lace 40. Elongated flexible lace 40 has a first end 41 that is integral to first side 11 or second side 12 of head 10. Elongated flexible lace 40 also includes second end 42. It is preferred that elongated flexible lace 40 is divided into essentially three sections; a first section 44, an intermediate section 45, having a plurality of lace teeth 27 and an end section 46. First section 44 divides first end 41 from intermediate section 45 and typically will contain no lace teeth. Intermediate section 45 of the elongated flexible lace 40 divides first section 44 from end section 46. The plurality of lace teeth 47 are preferably located in intermediate section 45. End section 46 of elongated flexible lace 40 includes second end 42.

A cross-section view of intermediate section 45 is shown in FIG. 6. Intermediate section 45 has a lace top 51, a lace bottom 52, lace teeth 47, a first lace track 48 and a second lace track 49. It is anticipated that lace teeth 47 can be associated with lace bottom 52 of intermediate section 45. The orientation of lace teeth 47 will determine whether second end 42 of elongated flexible lace 40 is inserted into first aperture 16 or second aperture 17 of head 10. It is preferred that lace teeth 47 are associated with lace top 51 of intermediate section 45 so that the reusable single piece fastener of this invention can be used as a shoelace in a shoe transition. Lace teeth 47 are preferably flush with either lace top 51 or lace bottom 52 or both.

Intermediate section 45 preferably includes first lace track 48 and second lace track 49. First and second lace tracks 48 and 49 provide a smooth surface for contacting first channel 15 and second channel 30 thereby facilitating the movement of elongated flexible lace 40 through first channel 15 and second channel 30.

Elongated flexible lace 40 includes end section 46 having second end 42. Second end 42 preferably includes a nib 43. Nib 43 preforms two functions. First nib 43 may be shaped to resemble a shoelace tip, and as such, performs an aesthetic function. Additionally, nib 43 is tapered to simplify the insertion of second end 42 into first channel 15 of head 10.

Elongated flexible lace 40 can be perpendicular to head 10 as shown in FIG. 3 or it can be angled in relation to head 10 as shown in FIG. 15. The reusable single piece lace embodiment of this invention preferably includes an elongated flexible lace 40 having one or more angles as shown in FIGS. 4 and 13.

The preferred reusable single piece lace includes a first angle $\Theta_1$ that directs elongated flexible lace 40 downwards towards bottom 14 of head 10. Angle $\Theta_1$ ensures that head 10 will be positioned optimally to accept second end 42 of elongated flexible lace 40 when creating a shoe transition. Angle $\Theta_1$ may have a range from about 10° to about 60°. Angle $\Theta_1$ is preferably about 20°.

Figure 12:
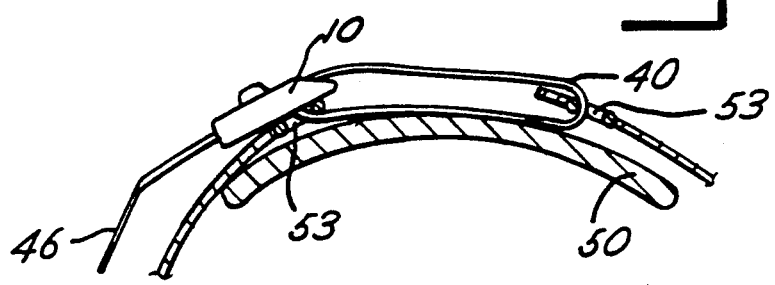

End section 46 of elongated flexible lace 40 may be angled. As shown in FIG. 4, end section 46 is preferably angled upwards towards top 13 of head 10. End section may include a single angle $\Theta_4$ or two angles $\Theta_2$ and $\Theta_3$. The sum of angles $\Theta_2$ and $\Theta_3$ or angle $\Theta_4$ may range from about 10° to about 60° with a total angle of 20° being preferred. There are a number of advantages to angled end section 46. First, an angled end section 46 is easier to grasp in comparison to a non-angled second end 46. Additionally, the angled end section 46 is easier to insert into first channel 15. Finally, when the single piece lace is secured, angled end section 46 will be directed towards shoe 50 as shown in FIGS. 10 and 12 so that end section 46 is almost flush with shoe 50.

The preferred reusable single piece lace embodiment of this invention includes two tapered fingers 22. Tapered fingers 22 grasp eyelet 52 and prevents head 10 from becoming oriented with eyelet 52 in a manner that would inhibit or prevent the insertion of second end 42 of elongated flexible lace 40 into first channel 15 of head 10.

The reusable single piece fastener of this invention can be manufactured of any strong flexible material known in the art. Examples of such materials include metals, plastics, and plastic coated metals. It is preferred that the reusable single piece fastener is manufactured of a strong, soft, flexible plastic such as nylon. Nylon is malleable and able to withstand the turns and the multiple fastening cycles required by the fastener of this invention. Nylon is also weather resistant, it is easily cleaned, and it can be tinted to provide an wide array of colored fasteners.

The reusable single piece fastener of this invention can also be decorated to render it aesthetically pleasing. Portions of or the entire fastener can be texturized to make the fastener resemble a shoe lace. Alternatively, decals or relief elements can be applied to the fastener. Finally, a cap can be constructed that is integral to or that fits over head 10 of the fastener. The cap will protect lace lock 25 from becoming wet or dirty and can also be shaped, for example, to resemble a cartoon character, a football, a star or to take on any desired shape.

This invention is also a method for reversibly securing securable items. The reusable single piece fastener of this invention can be used in a myriad of applications including as a cable tie, as a shoelace, to secure a mouthpiece to a diving regulator, to secure plastic bags, as a handcuff, to secure clothing items such as jackets, pants, and shirts, to secure tent flaps; to secure utility meters, to bundle pipes, wires, or cables, or to secure trees, flowers and plants to poles. This list is not intended to be exclusive. The fastener of this invention is effective as a replacement in most applications where laces, clasps, clips, ties, and other securing methods are used.

It is especially preferred that the reusable single piece fastener of this invention is used as a shoelace for a single lace transition. The fastener of this invention is useful as a lace for childrens shoes, adult shoes, combat boots, galoshes, medical shoes, and athletic shoes including cleats for football, soccer, and baseball, tennis shoes, running and walking shoes, basketball shoes, hiking boots, and in-line skates, ice skates, roller skates, ski boots, and any other laced athletic shoes. It is also anticipated that the shoelace of this invention can be used alone or in combination with conventional shoelaces to define shoe transitions.

The reusable single piece fastener of this invention is easily engaged. The first step in engaging the fastener is to locate it appropriately in relation to a securable article. For example, if the fastener was being used to secure a bag, it should be located adjacent to the end of the bag that is being sealed. Next, elongated flexible lace 40 is directed through or around the article to be fastened in a manner that results in second end 42 of elongated flexible lace 40 being placed through either first aperture 16 or second aperture 17 associated with head 10.

Figure 11:
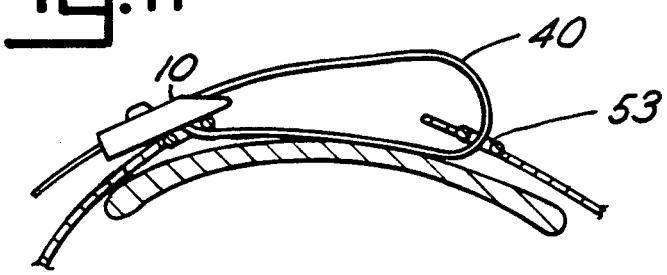
FIGS. 11, and 12 depict a method of creating a lace transition using a reusable elongated flexible shoelace of this invention.

Second end 42 will be located in first aperture 16 in situations where lace teeth 47 are located on lace to 51. This allows lace teeth 47 to engage locking teeth 29 when elongated flexible lace 40 is passed through first channel 15 and second channel 30. Alternatively, second end 42 can be inserted into second aperture 17 of head 10 when lace teeth 47 are located on bottom dimension 52 of elongated flexible lace 40. Again, in this orientation, elongated flexible lace 40 passes through first channel 15 and second channel 30 where lace teeth 47 engage locking teeth 29. The fastening loop formed by elongated flexible lace 40 in these two alternatives are different. In the first instance, the fastening loop resembles a sideways lower case "b", as shown in FIG. 11, while in the second situation, the fastening loop resembles the letter "o".

When second end 42 of elongated flexible lace 40 is located in the first aperture 16 or second aperture 17, second end 42 is pushed through first channel 15 and second channel 30 until second end 42 exits from the opposing aperture to define a protruding second end. Protruding second end 42 is manually grasped and pulled until one or more lace teeth 47 engage locking teeth 29 associated with pivot arm 28 of lace lock 25. At this point, the fastener is secured as shown in FIG. 9.

The fastener can be tightened by grasping second end 42 of elongated flexible lace 40 and pulling until the fastener reaches the desired tightness. The fastener can be loosened by depressing lock release button 28 and directing second end 42 towards head 10. Lock release button 28 is released when the desired level of secureness is attained.

Disengaging the secured fastener is performed in two steps. Lock release button 27 is depressed as shown in FIGS. 9A. Depressing lock release button 27 pivots lace lock 25 at flex point 26 and causes locking teeth 29 of pivot arm 28 to separate from lace teeth 47. At this point, the fastener is no longer locked. The fastener can be locked by releasing lock release button 27 or the fastener may be totally disengaged by pulling first section 44 or intermediate section 45 or pushing end section 46 of elongated flexible lace to direct elongated flexible lace 40 out of first channel 15 and second channel 30 until end 42 of elongated flexible lace 40 abuts the first aperture 16 or second aperture 17 of head 10. Lock release button 27 is released and elongated flexible lace 40 is pulled totally out of first channel 15 and second channel 30.

The tension of the reusable single piece fastener of this invention can be adjusted without disengaging the device. The locked fastener is tightened by pulling second end 42 of elongated flexible lace 40 until the desired fastener tightness is obtained. Alternatively, the fastener is loosened by depressing lock release button 27 and moving second end 42 of elongated flexible lace 40 towards head 10. When the desired tightness is obtained, lock release button 27 is released. When loosening or tightening the fastener, it should be appreciated that the fastener can only be adjusted to the extent that lace teeth 47 remain complimentary to locking teeth 29.

A preferred use for the fastener of this invention is to form a shoe transition. A plurality of the fasteners of this invention can be used to replace shoe laces on all types of shoes and especially shoe laces, clamps, and other fasteners used on athletic shoes such as tennis shoes, cleats, roller skates, ice skates, in-line skates, ski boots, and any other type of athletic shoe. When used as a shoe lace, a fastener of this invention is directed through two eyelets of the shoe to form a single lace transition. A plurality of fasteners are required for shoes having a plurality of opposing eyelets. FIG. 10 shows a shoe 50 including a plurality of reusable single piece laces of this invention forming lace transitions.

As shown in FIGS. 13-15, the preferred reusable shoe lace of this invention includes an elongated flexible lace 40 having lace teeth 47 integral to lace top 51 of intermediate section 45. This allows the fastening loop formed by the secured reusable lace to define a lower case "b". As shown in FIGS. 11 and 12, the reusable lace of this invention is used to form a secured lace transition in a shoe by passing nib 43 of elongated flexible lace through a first shoe eyelet, and a second shoe eyelet until head 10 abuts the outside dimension of the first shoe eyelet and tapered fingers 22 secure head 10 to eyelet 52. At this point, lace teeth 47 of elongated flexible lace and lock release button 27 of head 10 are facing upwards away from the shoe. Next, nib 43 along with second end 42 of elongated flexible lace 40 are directed over the top of the shoe into first aperture 16 of head 10, and through first channel 15 and second channel 30 until nib 43 protrudes slightly beyond second aperture 17 as shown in FIG. 11. Nib 43 is then grasped and pulled to draw intermediate section 45 of elongated flexible lace into first channel 15 and second channel 30 thereby uniting lace teeth 47 with locking teeth 29 on pivot arm 28. Second end 42 of elongated flexible lace 40 is pulled further until the lace is at the desired secureness to define a locked shoelace as shown in FIG. 12.

The locked shoelace may be tightened, loosened, or disengaged as described above by either pulling the second end 42 to draw elongated flexible lace further through head 10 or by depressing lock release button 27 and allowing elongated flexible lace 40 to be moved out of head 10.

A plurality of reusable flexible lace locks will be used to replace shoelaces in shoes having multiple sets of eyelets. Where multiple lace fasteners are used, each fastener can be individually adjusted to the proper tightness. This greatly enhances the ability of the shoe wearer to control shoe tightness. The reusable shoelace embodiment of this invention can be used with shoes having a variety of eyelet shapes. The fastener is useful with conventional round eyelets or with elongated eyelets. Elongated eyelets will generally require lace fasteners with elongated flexible laces having complementary dimensions.

The description above has been offered for illustrative purposes only, and it is not intended to limit the scope of the invention of this application which is defined in the following claims.

What I claim is:

1. A method for engaging a reusable single piece fastener to secure a securable article comprising a head including a first side and a second side, a first channel passing through the head, a first aperture associated with the first channel and with the first side of the head and a second aperture associated with the first channel and with the second side of the head, a lace lock flexibly associated with the head including a flex point uniting the lace lock and the head, a lock release button, a pivot arm having a plurality of locking teeth, and a second channel complementary to the first channel and an elongated flexible lace having a first end integral to the head, a second end, and a plurality of lace teeth complementary to the locking teeth, the method comprising;
    a. positioning the elongated flexible lace in relation to the securable article such that the elongated flexible lace can secure the securable article;
    b. passing the second end of the elongated flexible lace through an aperture associated with a side of the head and through the first channel and the second channel until the second end protrudes from the opposing aperture to form a loop out of the single piece fastener;
    c. grasping the protruding second end of the elongated flexible lace; and
    d. pulling the elongated flexible lace until one or more the plurality of lace teeth of the elongated flexible lace engages the locking teeth to give a locked single piece securing device.

2. The method of claim 1 wherein the locked single piece securing device is disengaged by the further steps of;
    depressing the release button until the locking teeth and the lace teeth are separated; and
    pulling the elongated flexible lace until it is no longer located in the first or the second channel.

3. The method of claim 2 wherein the elongated flexible lace is integral to the first side of the head and wherein the second end of the elongated flexible lace is directed through the first aperture.

4. The method of claim 1 wherein the locking teeth and the toothed portion of the elongated flexible lace are oriented in opposite directions when the fastener is unfastened.

5. The method of claim 1 wherein the securable article is a shoe transition, a plastic bag, a bundle of cables, or a clothing article.

6. A method of securing opposed shoe eyelets with a reusable single piece shoelace having a head including a top, a bottom, a first end, a second side, a first channel parallel to the top and bottom of the head passing through the head, a first aperture associated with the first side of the head, and a second aperture associated with the second end of the head, a lace lock flexibly associated with the head including a flex point uniting the lace lock and the housing, a lock release button extending beyond the housing, and a pivot arm having from three to six locking teeth, the lace lock further including a second channel parallel to the top and bottom of the head and complementary to the first channel, and an angled elongated flexible lace having a first end integral to the housing including textured section dividing the head from an intermediate toothed section having a plurality of lace teeth complementary to the locking teeth, and a second end including a nib, the second end being angled towards the head, the method comprising the steps of:
    a. passing the nib of the second end of the elongated flexible lace through a first shoe eyelet and through a second shoe eyelet until the first side of the head abuts the first shoe eyelet;
    b. directing the nib of the second end of the elongated flexible lace through the first aperture, through the first channel, and through the second channel until the nib of the second end protrudes from the second aperture;
    c. grasping the protruding nib of the second end of the elongated flexible lace; and
    d. pulling the nib of the second end of the elongated flexible lace until one or more of the plurality of lace teeth engages a locking tooth to give a secured shoelace.

7. The method of claim 6 wherein the shoelace is tightened by pulling the second end of the elongated flexible lace until the desired secureness is reached.

8. The method of claim 6 wherein the shoelace is loosened by depressing the lock release button until the locking teeth and the lace teeth are separated;
    directing the second end of the elongated flexible lace towards the head until the desired secureness is reached; and
    releasing the lock release button.

9. The method of claim 6 wherein the reusable single piece shoelace is disengaged by the further steps of;
    depressing the release button until the locking teeth and the lace teeth are separated; and
    pulling the elongated flexible lace until the locking teeth can no longer engage the lace teeth.

* * * * *